_United States Patent Office_ 2,870,035
Patented Jan. 20, 1959

2,870,035

COATING COMPOSITION AND PROCESS OF PREPARATION

Lyman S. Allen, Gloucester, Mass., assignor to Monsanto Chemical Company, St. Louis, Mo., a corporation of Delaware No Drawing. Application May 6, 1954
Serial No. 428,131

17 Claims. (Cl. 106—192)

The present invention relates to improvements in flatted and semi-gloss coating compositions, and to processes for preparing such compositions. More particularly this invention relates to improvements in flatted and semi-gloss lacquers, especially nitrocellulose lacquers, and to processes of preparing such lacquers.

It has been proposed heretofore to use various silica materials, including silica aerogels, in coating compositions for the purpose of providing a composition which when applied to a base such as wood produces a flatted coating or a coating having a considerably reduced gloss or shine. Such compositions and coatings are commonly referred to as flatted or semi-gloss compositions and coatings. However, when silica materials such as silica aerogels are introduced into various coating compositions, and particularly lacquers as, for example, nitrocellulose lacquers, they are subject to agglomeration and settling, that is, they tend to settle out of such compositions or lacquers to form a layer containing agglomerated particles which are extremely difficult to disperse to particles of the original size by ordinary stirring.

In accordance with the present invention it is possible to produce flatted coating compositions and particularly lacquers containing a silica flatting agent which is relatively free of the tendency to settle to form layers of agglomerated particles. Although the flatting agents in the compositions of this invention may settle, they flocculate to form a voluminous, relatively soft deposite of unagglomerated particles which can be readily dispersed throughout the coating vehicle by simple stirring.

It is one object of this invention to provide an improved process of producing flatted or semi-gloss coating compositions, particularly flatted or semi-gloss lacquers, containing particles of a flatting agent which do not agglomerate or form difficultly dispersible layers on standing.

It is a further object of this invention to provide an improved process of flatting lacquers, particularly nitrocellulose lacquers, with modified silica aerogel flatting agents and to substantially eliminate the formation of agglomerates of particles of flatting agent in the lacquer vehicle.

It is a further object of this invention to provide flatted or semi-gloss coating compositions, particularly flatted or semi-gloss lacquers, containing particles of a flatting agent which do not agglomerate to any appreciable extent on standing.

It is a further object of this invention to provide flatted or semi-gloss lacquers, particularly nitrocellulose lacquers, containing particles of a modified silica aerogel flatting agent which do not agglomerate to any appreciable extent on standing.

Still further objects and advantages of this invention will become apparent from the following description and the appended claims.

In the application of Ralph F. Nickerson, filed on the same day as this application and assigned to the same assignee as this application, there is described a process of treating various hydrophilic, yet water-insoluble silica materials having an acid number above 0.2 and containing a multitude of silanol groups with an organic silicate having at least two —OR groups, where R is an alkyl, aryl, aralkyl, or alkaryl radical, attached to a silicon atom which is also attached to at least one other oxygen atom. The resulting products may be hydrophilic to completely hydrophobic, and they may be non-organophilic or organophilic, depending primarily on the kind and amound of silicate employed.

The present invention is based on the discovery that particles of the hydrophilic to partially hydrophobic but non-organophilic silica materials described in said Nickerson application may be readily incorporated in coating compositions containing a film-forming material dissolved in one or more organic liquids, particularly coating compositions such as lacquers of the nitrocellulose type, to provide flatted or semi-gloss compositions which when applied to a base material and allowed to dry produce clear, transparent flatted or semi-gloss coatings having a smooth surface. The coating composition or lacquer may be stored or allowed to stand for considerable periods of time without appreciable agglomeration of the particles of the silica material. Although some settling of the particles of the silica flatting agent does occur, the sediment is extremely loose and substantially non-aggregating and usually occupies one-third and more of the volume of the composition. This sediment of particles is readily redispersed in the composition by simple stirring.

The silica flatting agents employed in the coating compositions of this invention are prepared, in general, by contacting an amorphous, hydrophilic (that is, it is rapidly wetted by water) yet water-insoluble solid silica material having an acid number above 0.2 and containing a large number or multitude (one thousand or more) of silanol groups (—$\overset{|}{\underset{|}{Si}}$—OH groups)

with an organic silicate having at least two —OR groups attached to a silicon atom which is also attached to at least one other oxygen atom, where R is an alkyl, aryl, aralkyl, alkaryl group, until a hydrophilic to partially hydrophobic but non-organophilic product is obtained. The term "non-organophilic" as used herein is intended to mean a product which is preferentially wetted by water when shaken with a mixture of water and n-butanol. Even though the starting silica material is hydrophilic, that is, it is rapidly wetted by water, and the treated material (flatting agent) may also be hydrophilic, there is a considerable difference in the utility of the two materials which indicates that the surface chemical composition and surface properties of the two materials are quite different.

The amorphous, hydrophilic silica material which is employed as the starting material for the preparation of the flatting agents of the present invention may be silica which has been hydrated with water, or polymerized silicic acid, or partially dehydrated silicic acid. Since these materials are hydrophilic (rapidly wetted by water) yet water-insoluble solids containing a large number (a thousand or more) of silanol (—$\overset{|}{\underset{|}{Si}}$—OH groups)

they are hereinafter referred to as amorphous hydrophilic silica materials containing a multitude of silanol groups. The amorphous, hydrophilic silica materials which are suitable for the preparation of the flatting agents of the present invention are those which have an acid number of above 0.2 but below 5, and the preferred silica materials are those having an acid number between 0.3 and 3. Although the amorphous, hydrophilic silica material may vary as to its physical properties, it is desirable to use hydrophilic, amorphous silica materials having a surface area of at least 80 square meters per gram, as measured by the method of Brunauer, Emmett and Teller described in the Advances in Colloidal Science, volume 1, pages 1 to 36 (1942), published by Interscience Publishers Inc., New York, N. Y., preferably a surface area between 100 and 600 square meters per gram. It is also desirable to employ amorphous, hydrophilic silica materials which have a white color, a bulk density below 10 pounds/cubic foot, preferably between 2 and 8 pounds/cubic foot, and an ultimate particle size between about 5 and 40 millimicrons. The ultimate particle size is the size of the average particle, as delineated by an electron microscope, in a silicone rubber prepared by thorough milling of the amorphous, hydrophilic silica material in a silicone gum followed by curing or vulcanization of the gum.

As examples of amorphous, hydrophilic silica materials which have the above described physical properties and also the above described acid number, may be mentioned silica aerogels. Such aerogels may be prepared, for example, by the processes described in Kistler Patent No. 2,093,454, the White Patent No. 2,285,477 and the Marshall Patent No. 2,285,449. Another suitable amorphous, hydrophilic silica material may be prepared by the following method or by obvious modifications thereof. Two liters of an aqueous solution containing 45 grams of $H_2SO_4$ are heated to 80° C., and then two liters of an aqueous solution of sodium silicate containing 4% $SiO_2$ and having a molar ratio of $SiO_2:Na_2O$ of 3.36 are added with stirring over a period of 15 minutes. The temperature is maintained at 80° C. throughout the mixing and thereafter the solution is cooled to 50° C. and adjusted to a pH of 5, whereupon it gels. The gel is broken up, filtered, and the filter cake is washed on the filter with water. The filter cake is then dried at the temperature of 50° C. until it contains about 1% by weight of residual free water.

The term "acid number" as used herein in connection with the amorphous, hydrophilic silica materials is intended to mean the number of milligrams of KOH required to neutralize one gram of silica material to a pH of 5.2. This acid number is suitably determined by thoroughly mixing 4 grams of dry silica material with 100 milliliters of distilled water and then titrating the resulting suspension with 0.01 N sodium hydroxide to a pH of 5.2 as measured by glass electrodes which have been standardize dagainst a aqueous buffer solution at a pH of 4.0. The acid number is calculated by the following equation:

$$\frac{\text{Milliliters of NaOH solution} \times N \times 0.0561 \times 1000}{4} =$$

milligrams of KOH per gram of silica material, or acid number

In the above equation N represents the normality of the NaOH solution.

The treatment of the amorphous, hydrophilic silica material with the organic silicate results in a reaction or chemical change as is indicated by the fact that the organic silicate cannot be extracted from the resulting product with an organic liquid which is a solvent for the organic silcate employed. The organic silicate reacts with some of the silanol groups of the amorphous, hydrophilic silica material whereby one of the R radicals of the organic silicate replaces the hydrogen of the silanol group to form a

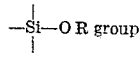

on the silica material, and also a silanol compound having an —OR group and an —OH group attached to a silicon atom which is attached to at least one other oxygen atom, wherein R has the significance hereinbefore described. This silanol compound partly reacts with other silanol compounds formed from the organic silicate to form a polymerized organic silicate which is no longer soluble in a solvent for the starting organic silicate and part of the silanol compound reacts with the silanol groups of the silica material to form a structural unit

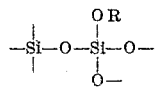

where R has the significance hereinbefore described, and the free valences of the oxygen atoms are satisfied by silicon atoms or R radicals. To illustrate, when the organic silicate is a compound having the structural formula.

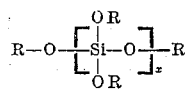

where $x$ is an integer from 1 to 20 and R has the significance hereinbefore given, the silicate reacts with some of the silanol groups of the amorphous, hydrophilic silica material to form a silica material having some

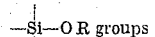

and also forms, a silanol compound having the structural formula

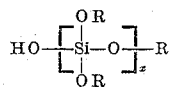

This silanol compound reacts in part with silanol groups of the silica material to form

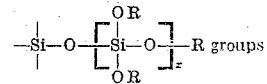

as part of the silica material, and also reacts in part with other silanol groups formed from the silicate to form a polymer of the organic silicate. Since the silica material contains small amounts of moisture, for example, from about 0.1 to 2% by weight, which hydrolyzes some R radicals from the silanol compound, the polymer formed is of high molecular weight and is insoluble in an organic solvent for the starting organic silicate. The product obtained is a silica material containing silanol groups,

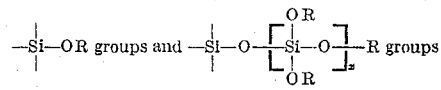

and having a surface film of a polymer of the starting organic silicate, namely a polymer having the structural formula

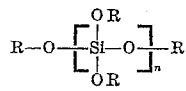

where $n$ is an integer above 25. In the silica material flatting agents employed in the present invention the film of the polymer is discontinuous, and the product is non-organophilic and hydrophilic to partially hydrophobic depending on the number of silanol groups present and the amount of the polymer film on the surface of the silica material which is governed by the amount and kind of organic silicate applied to the silica material. Even though the product may be hydrophilic it has a chemical composition and surface properties which are materially different from those of the starting silica material, due to the fact that it contains considerably fewer silanol groups and has a partial film of polymerized organic silicate.

In the various formulas herein given the free valences of the silicon atoms are satisfiied by oxygen atoms which are attached to hydrogen atoms and/or other silicon atoms.

The flatting agents employed in the present invention may be prepared by contacting or treating the amorphous, hydrophilic silica material with the organic silicate in various ways. Thus, the amorphous, hydrophilic silica material may be immersed in a substantially anhydrous solution of the organic silicate and then removed or separated from the solution and allowed to stand until a dry or substantially dry product is obtained. The resulting product is then comminuted or ground, preferably in an air attrition mill, and consists of solid silica materials having the surface structure thereof altered as hereinbefore described, but having substantially the same surface area, appearance and bulk density as the starting material.

The amorphous, hydrophilic material may also be treated during a comminuting or grinding operation with vapors of the organic silicate or with a fine spray consisting of droplets of the organic silicate or with droplets of a substantially anhydrous solution of the organic silicate in an organic liquid which is a solvent for the silicate. It is possible to maintain the solid silica particles in a free-flowing condition during the grinding or comminuting operation by controlling the number of droplets applied to the silica material. The grinding or comminuting is preferably carried out using an air grinding or attrition mill, for example, of the type illustrated in Figure 51 on page 1145 of Chemical Engineers' Handbook (3rd edition) published by McGraw-Hill of New York, N. Y. The grinding or comminuting is preferably carried out in an atmosphere of air which is preferably at a temperature sufficiently high to prevent the condensation of water on the silica material but below the decomposition temperature of the organic silicate. Suitable air temperatures for this purpose are above 100° C., and preferably between 110 and 200° C. The product obtained by this procedure is comparable to the product produced by the immersion treatment described in the preceding paragraph, but the application during the grinding or comminuting is more economical and is therefore preferred over the immersion process. When the amorphous, hydrophilic silica material is a silica aerogel, the application of the organic silicate during the grinding or comminuting operation has an advantage over the immersion process since the former process does not alter the physical properties of the aerogel whereas an immersion process has a tendency to shrink the aerogel to some extent and thus alter the physical properties of the aerogel. This is detrimental to some extent in the use of the silica material flatting agents in the coating compositions of this invention. The rate at which the spray of the organic silicate is applied to the silica material may be varied depending on the particular amorphous, hydrophilic silica material treated, the kind of organic silicate used and the organic liquid, if such is used, in which it is dissolved, the properties of the product desired and the amount of the amorphous, hydrophilic silica material being treated. In general, the silicate is applied in droplets at the rate of about 5 to 35 parts by weight per 100 parts by weight of the silica material, although these rates and proportions may be varied considerably depending on the product desired and the concentration of the silicate applied.

The silica aerogels may also be treated after such aerogels have been formed in an autoclave, but prior to the removal of the aerogel from the autoclave, with vapors of the organic silicate, or with a spray of fine droplets consisting of the organic silicate, or with a spray of fine droplets consisting of the organic silicate dissolved in a substantially anhydrous liquid which is a solvent for the silicate. The treatment is continued until the silica aerogel has the desired properties and thereafter the silica aerogel is removed from the autoclave and comminuted or ground to the desired particle size.

In carrying out the grinding or comminuting operations described in the three preceding paragraphs, it is desirable to continue the grinding or comminution operation until the treated silica materials have an aggregate particle size between about 0.01 and 15 microns. It is preferred to grind or comminute the silica materials until 70% or more of the particles are between about 1 and 5 microns, about 10% are below 1 micron and the remainder are between about 6 and 15 microns.

By carrying out the processes described above, it is possible to produce hydrophilic to partially hydrophobic silica flatting agents which are non-organophilic in that they are wetted preferentially by water when shaken with a mixture of water and n-butanol. In general, when tetraethyl orthosilicate is employed, it is possible to obtain hydrophilic to partially hydrophobic products which are non-organophilic in that they are preferentially wetted with water when shaken with a mixture of water and n-butanol, by applying from about 3 to about 20% by weight of such silicate, based on the dry silica material. If the amount applied is appreciably below 3%, the product is not sufficiently different from the starting silica material and does not differ sufficiently in utility therefrom. If the amount of organic silicate applied is appreciably above 5%, based on the weight of the dry silica material, the product becomes increasingly hydrophobic. The preferred amount of organic silicate is about 4 to 10% by weight, based on the weight of the dry silica material. In the case of tetraethyl orthosilicates the lower limit is about 4% and the upper amount may be about 25%, whereas in the case of silicates having R radicals containing more than 2 carbon atoms or silicates having a higher molecular weight than tetraethyl orthosilicate the lower amount applied may be as low as 2% by weight and the upper limit is about 15% by weight. It is thus seen that the amount of organic silicate applied to the silica material to obtain a hydrophilic to partially hydrophobic, non-organophilic product, that is, one which is preferentially wetted with water when shaken with a mixture of n-butanol and water, is between 2 and 25% by weight, based on the dry silica material, depending on the particular organic silicate used.

The partially hydrophobic silica flatting agents, for example, those which have been treated with more than 5% and up to 20% by weight of the organic silicate, based on the dry silica material, may be rendered more hydrophobic by aging or by heating at elevated temperatures for varying periods of time. For example, the treated materials may be aged at room temperatures or they may be heated at atmospheric pressure or sub-atmospheric pressure at temperatures above 80° C. but below the decomposition temperature of the organic silicate, preferably between 100 and 300° C. for periods of 5 minutes to 24 hours, with the longer periods corresponding to the lower temperatures.

As was pointed out previously herein, the organic silicate may be a liquid organic silicate having two —OR groups attached to a silicon atom which is also attached to at least one other oxygen atom, wherein R is an alkyl, aryl, aralkyl, or alkaryl radical, including, for example, the alkyl esters of orthosilicic acid and dehydration products thereof and alkyl esters of metasilicic acid. A suitable class of compounds for use in the treatment of the amorphous, hydrophilic materials are compounds having the structural formula:

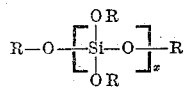

where R has the same significance as given above, and $x$ is an integer from 1 to 20, including, for example, tetrabenzyl orthosilicate and tetraphenyl orthosilicate. A particularly suitable class of compounds are those having the structural formula:

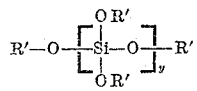

where R' is an alkyl radical having from 1 to 6 carbon atoms and $y$ is an integer from 1 to 10, including such compounds as tetramethyl orthosilicate, tetraethyl orthosilicate, tetrapropyl orthosilicate, tetrabutyl orthosilicate and the like and the various polymers thereof containing from 2 to 10 —Si—O— units. The preferred compound of this class is tetraethyl orthosilicate as it is readily available and gives excellent results. Polyethyl orthosilicates having from 2 to 10 —Si—O— groups in the molecule are also especially suitable, as are mixtures thereof with tetraethyl orthosilicate. As examples of other organic silicates which may be used may be mentioned organic esters, particularly alkyl esters, of tetrasilicic acid, meta-disilicic acid and meta-trisilicic acid; polyhydric alcohol silicates such as secondary glycol silicate, tertiary glycerol silicate and the like; and condensed polyhydric alcohol silicates.

The silica flatting agents described above, which are also described and claimed in the Nickerson application hereinbefore referred to, are particularly effective when they are incorporated in coating compositions which contain one or more organic liquids in which is dissolved a film-forming material which forms a useful protective film merely on evaporation of such liquid or liquids. This type of coating composition, which is commonly referred to as a lacquer, may also contain the usual additives such as plasticizers, corrosion inhibitors and pigments, although this type of coating composition rarely contains pigments. This invention is particularly applicable to clear coating compositions, that is, clear lacquers, for the purpose of producing flatted, but non-pigmented coatings.

As examples of lacquers which may be flatted in accordance with the present invention may be mentioned the benzyl cellulose lacquers, ethyl cellulose lacquers, cellulose acetate-acetone lacquers, maleic-rosin lacquers, nitrocellulose lacquers, polyvinyl chloride and vinyl chloride-vinyl acetate copolymer lacquers, cellulose aceto-butyrate lacquers and polymethyl methacrylate lacquers. Other examples are natural resin lacquers such as copal, Manila gum and shellac lacquers. The problem of agglomeration of particles of the prior art silica flatting agents is particularly troublesome in the case of lacquers which contain in the solvent phase a major proportion of more or less polar solvents such as esters, ketones and alcohols. The silica flatting agents of the present invention are particularly suitable for use in lacquers containing such organic liquids or solvents since they substantially eliminate the agglomeration heretofore encountered with prior silica flatting agents, and hence are preferred in those lacquers which contain polar solvents, for example, liquids such as esters, particularly the lower alkyl esters of acetic acid; ketones, particularly acetone, methyl ethyl ketone and di-isobutyl ketone; and alcohols, particularly methanol, ethanol, isopropanol, n-propanol, n-butanol, butanol-2 and isobutyl alcohol. The preferred lacquers are those which contain nitrocellulose as the primary film-forming material, and preferably one or more of the foregoing esters, ketones or alcohols.

The silica flatting agents employed in the composition of this invention are to be distinguished from organic or inorganic pigments which have the property of imparting color to the coating formed from the coating composition, and the term "color" is intended to include white and black, whereas the silica flatting agents of the present invention do not impart color to the coating, that is, they do not appreciably change the original color of the coating. Moreover, small quantities of the pigments tend to opacify the coating, that is, they render the coating less clear and less transparent, whereas the silica flatting agents employed herein do not appreciably change the clarity or transparency of the coating when used in small amounts, say up to 10% on the weight of the coating composition solids. The silica flatting agents employed herein are also distinguished from most pigments in that they have a considerably larger surface area than pigments and are composed of particles the average size of which is considerably larger than most pigment particles. The silica flatting agents used herein are distinguished from soluble dyes in that they are not coloring materials and are not soluble in the coating vehicle.

The coating compositions of the present invention contain the silica flatting agents in the form of relatively fine particles having an average particles size between about 0.1 and 15 microns, with the major proportion of the particles having an average particle size below 5 microns. In the case of silica aerogel flatting agents, best results are obtained when the average particle size of the aerogel particles is between about 0.8 and 3 microns.

The coating compositions of this invention are prepared, in general, by dispersing the silica flatting agent in the coating composition. This may be accomplished in various ways depending to some extent on the particle size of such agent, the particular coating composition employed and the properties desired in the coating prepared from such composition. For example, when the silica flatting agent is incorporated in certain types of lacquers as, for example, vinyl chloride-vinyl acetate copolymer lacquers in which the copolymer is dissolved in a ketone, it is possible to disperse the silica flatting agent in the lacquer by simple stirring if the agent is of the desired particle size. If the agent is too coarse, the lacquer may be subjected to a grinding operation as on a two or three roll mill to make the lacquer smooth enough for coating purposes. In the case of wood lacquers such as nitrocellulose lacquers where the smoothness of the coating is of primary importance, it is desirable to grind the silica flatting agent in the lacquer until the resulting dispersion is smooth and the flatting agent forms a voluminous precipitate or sediment when allowed to stand. When smoothness of the coating is essential, it is preferred to carry out the grinding operation in a pebble mill until a coating formed from the lacquer is smooth, but insufficient to materially reduce the flatting efficiency of such agent.

In carrying out the dispersion of the silica flatting agent in lacquers, it is preferred to grind the agent in a lacquer which has been thinned to a moderate or low solids content, for example, a film-forming solids content of about 3 to 12% by weight. After the dispersion has been ground until a smooth coating is obtained therefrom, at least one and preferably 2 or more increments of the more concentrated lacquer are added to build up the solids content of the original grind, and this enables the preparation of fairly concentrated coating compositions or lacquers. It is usually not necessary to grind the lacquer after the increments of concentrated lacquer have been added, and in many instances further grinding is undesirable since there is generally a loss in flatting efficiency with further grinding.

When grinding is used to produce a smooth coating, the grinding operation may be carried out on a two roll mill or in a pebble mill or steel ball mill or the like. Other forms of grinding apparatus commonly used in the coating composition or lacquer art may be used as will be apparent to those skilled in the art. In preparing the coating compositions of this invention best results have been obtained by grinding in a ball mill, especially a pebble mill, and such means are preferred.

The proportions of ingredients used in preparing the coating compositions of this invention may be varied considerably depending upon the amount of flatting desired and the particular coating composition and silica flatting agent employed. The amount of film-forming solids in the composition may vary considerably depending on the kind of film-former used and whether the composition is to be employed by spraying, brushing, hot spraying or dipping. In general, the coating composition may contain from about 20 to 60% by weight of film-forming solids, but in the case of wood lacquers, for example, a sprayable nitro-cellulose lacquer, the film-forming solids usually comprise about 20 to 35% by weight of the composition. The silica flatting agent is usually incorporated in a base grind which contains a relatively small amount of film-forming solids, usually between about 3 and 12% by weight, so as to obtain efficient grinding and high flatting agent content. The base grind is then mixed with the concentrated coating composition or lacquer to build up the solids content of the composition or lacquer within the range given above. The base grind and the concentrated coating composition need not contain the same ingredients, but it is preferred to employ a base grind which contains at least one of the film-forming materials and the same solvents employed in the concentrated coating composition or lacquer.

The amount of silica flatting agent incorporated in the final coating composition or lacquer depends primarily on the efficiency of the flatting agent used, the duration of grinding and the amount of flatting desired. When silica aerogels which have been treated with an organic silicate as herein described are employed, it is possible to use smaller amounts than would normally be used in the case of silica aerogels per se or in the case of other flatting agents to obtain the same reduction in gloss. In general, the silica flatting agent is used in amounts sufficient to reduce the gloss of coatings formed from the coating composition, but insufficient to materially decrease the clarity, transparency and strength of the coating. In most instances satisfactory results are obtained in the case of silica aerogels treated with organic silicates as herein described by using from 1 to 5% of flatting agent solids based on the film-forming solids in the final coating composition or lacquer. In some cases even less than 1% of silica aerogel solids may be used if only a slightly dulled film is desired. In general, when silica materials, other than silica aerogels treated with the organic silicate are used, it is necessary to use about 1 to 2% more of such silica materials to obtain a coating of equivalent flatness. Completely flatted coatings may be obtained by using up to 30% on the film-forming solids in the composition or lacquer of a silica aerogel treated with the organic silicate without detracting appreciably from the clarity, transparency or strength of the coating. However, with other silica flatting agents smaller amounts must be used when no appreciable loss in coating film strength can be tolerated, with a consequent decrease in the amount of flatting. It is thus seen that the amount of silica flatting agent is generally within the range of about 1 to 30% by weight, based on the film-forming solids in the final composition or lacquer, depending on the degree of flatting desired and the particular silica flatting agent used. When silica aerogels treated with the organic silicate are employed, it is preferred, for most purposes, to use from about 4 to 15% by weight thereof, based on the film-forming solids in the final coating composition or lacquer.

In carrying out the preparation of the flatted or semigloss coating compositions the time of grinding may be varied to some extent depending upon the base grind vehicle used and the type of grinding means and procedure used. One of the advantages of the silica flatting agents of the present invention is the ease with which they are dispersed in coating compositions or lacquers to form compositions which provide smooth coatings. Thus, in the case of silica aerogels per se or other prior art silica flatting agents, it has usually been necessary to grind such materials in a base grind for a period of at least 2.5 hours to obtain a smooth coating. This resulted in numerous disadvantages such as decreased production, decreased flatting efficiency, that is, less reduction in gloss because of longer grinding periods, and non-uniformity of flatting from batch to batch. The silica flatting agents of the present invention, on the other hand, are readily ground in a base grind within a period of 15 to 90 minutes to provide a smooth grind which may be mixed with concentrated coating compositions or lacquers to provide a smooth flatted coating. This not only results in increased production, but also gives more uniform flatting from batch to batch and greater flatting efficiency because of less grinding time. The grinding time may be increased by 30 minutes if outstanding smoothness of the coating is desired but any improvement in smoothness is obtained at the expense of flatting efficiency. Accordingly, it is preferred to grind the silica flatting agent in the base grind for a period between about 30 and 90 minutes.

A further understanding of the compositions and methods of this invention will be obtained from the following specific examples which are intended to illustrate this invention but not to limit the scope of the invention, parts and percentages being by weight unless otherwise specified.

*Example 1*

A silica flatting agent was first prepared by stirring two hundred parts of silica aerogel particles having a bulk density of 5.6 pounds per cubic foot, an acid number of 0.6, a surface area of about 175 square meters per gram and a moisture content of about 1% into a solution of 40 parts of n-butyl ether, 500 parts of diethyl ether and 30 parts of tetraethyl orthosilicate. The resulting mixture, which was in the form of a paste, was allowed to stand until it was substantially free of the ether solvents. This product was then comminuted until particles having an aggregate particle size below 5 microns (specifically between 1 and 3 microns) where obtained. The resulting product had substantially the same physical properties as the starting silica aerogel, but the surface thereof contained silanol groups

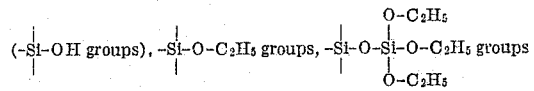

and a discontinuous film of polymerized tetraethyl orthosilicate which film could not be removed by extraction with diethyl ether. The product was only partially hydrophobic in that it was not wetted immediately when placed on the surface of water, but was wetted after standing on the surface of water for several hours. Also, the product was non-organophilic in that it was wetted preferentially by water when shaken with a mixture of n-butanol and water.

A lacquer base grind was prepared by grinding 15 parts of the dry silica aerogel flatting agent, prepared as described in the preceding paragraph, and 135 parts of a lacquer having the composition given immediately below in a ball mill with 300 parts of 1 inch flint stones for a period of 1 hour.

| Clear lacquer for base grind: | Percent |
|---|---|
| Butyl acetate | 31.8 |
| Butyl alcohol | 27.2 |
| Toluene | 31.8 |
| Ethanol | 3.2 |
| Nitrocellulose (½ second) | 6.0 |

At the end of the 1 hour grinding period, the base grind was smooth and it was then diluted with a clear wood lacquer having the composition given below using 36 parts of this wood lacquer for every 14 parts of the base grind:

| Clear wood lacquer: | Parts |
|---|---|
| ½ second dry nitrocellulose | 10 |
| Maleic-rosin ester gum | 4 |
| Castor oil modified glycerinephthalic anhydride alkyd resin (non-drying) | 6 |
| Dibutyl phthalate | 2.5 |
| Raw castor oil | 2.5 |
| Butyl acetate | 11.25 |
| Butyl alcohol | 7.5 |
| Ethyl alcohol | 11.25 |
| Ethyl acetate | 10 |
| Toluene | 37.5 |

The resulting lacquer contained 13.2% of the silica aerogel flatting agent based on the film-forming solids in the lacquer. When the lacquer was sprayed on a piece of stained, filled maple and the solvent was allowed to evaporate, a smooth, clear, but flatted coating was obtained. When the lacquer was applied to a black plate glass and allowed to dry, a smooth coating was obtained which had a reflectance of 5 as measured by a Photovolt glossmeter. After standing for 3 months, the silica aerogel flatting agent in the lacquer had settled in the form of a voluminous soft precipitate which occupied about one-half of the volume of the lacquer. This precipitate was readily dispersed by simple stirring and provided coatings which were equivalent in every aspect to the coatings formed from freshly prepared lacquers.

A base grind and lacquer was prepared in the same manner as described in the preceding paragraph with the exception that the silica flatting agent was the untreated silica aerogel, that is, the starting silica aerogel which had not been treated with the tetraethyl orthosilicate. At the end of a one hour grinding period the base grind did not give smooth coatings and an additional 4 hour grinding period was required to give a smooth coating. After 3 months of storage the flatting agent in the lacquer had settled to form a layer of agglomerated particles in the bottom of the lacquer which layer was extremely difficult to disperse to particles of original size by simple stirring. The resulting dispersion did not give smooth coatings due to the fact that the particles of silica aerogel had agglomerated during storage.

*Example II*

A silica aerogel flatting agent was first prepared by supplying particles of a silica aerogel having a bulk density of 5.6 pounds per cubic foot, an acid number of 0.85, a surface area of about 130 square meters per gram and a moisture content of about 1%, to the feed jet of a small grinding device of the type illustrated in Figure 51 on page 1145 of Chemical Engineers' Handbook (3rd edition) published by McGraw-Hill of New York, N. Y., at the rate of 110–120 grams per minute for a period of 25 minutes. Simultaneously, tetraethyl orthosilicate was sprayed in the form of fine droplets into the straight down section of the device at the rate of 6 cubic centimeters per minute over the same 25 minute period. Grinding was carried out using air at a temperature of 130° C. and pressure of 55–60 pounds per square inch at the rate of 80 cubic feet per minute. At the end of this period of time grinding was discontinued and the particles were collected in a cyclone separator. The collected particles had an average particle size between 1 and 3 microns and had the same physical properties and acid number as the starting silica aerogel, but the surface thereof contained more silanol groups and fewer

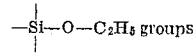

and

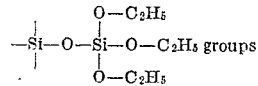

than the product prepared as described in the first paragraph of Example I. The product also contained a discontinuous coating of polymerized tetraethyl orthosilicate which could not be removed from the product by extraction with diethyl ether. The product was slightly hydrophobic but was non-organophilic in that it was preferentially wetted with water when shaken with a mixture of water and n-butanol.

The silica aerogel flatting agent, prepared as described in the preceding paragraph, was used to prepare a base grind and lacquer employing the ingredients and procedure described in the second paragraph of Example I. The resulting lacquer was comparable to the lacquer obtained by the procedure described in the second paragraph of Example I, but was more highly flatted, that is, it gave less reflectance, indicatnig that the silica aerogel flatting agent prepared according to the first paragraph of Example II had a higher flatting efficiency than the silica aerogel flatting agent prepared according to the first paragraph of Example I.

*Example III*

Five percent by weight of silica aerogel flatting agent, prepared as described in the first paragraph of Example II, based on the lacquer solids was ground in a pebble mill for 60 minutes in a cellulose acetate lacquer of the following composition:

| | Percent |
|---|---|
| Toluene | 9.2 |
| Butyl acetate | 11.5 |
| Acetone | 26.4 |
| Ethyl acetate | 24.0 |
| Ethylene glycol monomethylether | 15.6 |
| Methyl phthalyl ethyl glycollate | 9.2 |
| Cellulose acetate | 4.1 |

On standing the silica aerogel flatting agent had settled to some extent, but the sediment was loose and voluminous and occupied about two-thirds of the volume of the lacquer which was readily dispersed by simple stirring. A coating formed from the lacquer was smooth and had a semi-gloss appearance.

A silica aerogel per se, that is, an untreated silica aerogel, was employed to flat a cellulose acetate lacquer in the same manner as described in the preceding paragraph. After the lacquer was allowed to stand for a few hours, the silica aerogel settled to form a layer of agglomerated particles which were difficult to redisperse to their original particle size by simple stirring.

*Example IV*

Three-tenths part of the silica aerogel flatting agent, prepared as described in the first paragraph of Example I, was stirred into a lacquer containing 7 parts of ethyl cellulose and 93 parts of acetone. After standing for several months, the silica aerogel flatting agent had settled to some extent, but the sediment was voluminous and occupied about one-half the volume of the lacquer and was readily dispersed by simple stirring.

A similar lacquer prepared by the use of particles of silica aerogel per se (that is, untreated silica aerogel) showed particle agglomeration within a short period of time, that is, the silica aerogel particles had settled to form a compact layer of agglomerated particles in the bottom of the lacquer, which particles were difficult to redisperse to their original particle size by simple stirring.

*Example V*

An amorphous hydrophilic silica material containing 1000 and more silanol groups and having an acid number of about 1.9 was prepared by first heating two liters of an aqueous solution containing 45 grams of $H_2SO_4$ to 80° C. and adding with stirring over a period of 15 minutes two liters of an aqueous solution of sodium silicate containing 4% $SiO_2$ and having a molar ratio of $SiO_2:Na_2O$ of 3.36. The temperature of the resulting solution was maintained at 80° C. throughout the mixing and thereafter the solution was cooled to 50° C. and adjusted to a pH of 5, whereupon it gelled. The gel was broken up, filtered and the filter cake was washed on the filter with water. The filter cake was dried at a temperature of 50° C. until it contained about 1% by weight of residual free water, and was then broken up into relatively fine particles.

The silica material, prepared as described immediately above, was supplied to the feed jet of a small grinding device of the type illustrated in Figure 51 on page 1145 of Chemical Engineers' Handbook (3rd edition) published by McGraw-Hill of New York, N. Y., at the rate of 110–

120 grams per minute for a period of 25 minutes. Simultaneously, tetraethyl orthosilicate was sprayed in the form of fine droplets into the straight down section of the device at the rate of 9 cubic centimeters per minute over the same 25 minute period. Grinding was carried out using air at a temperature of 130° C. and pressure of 55-60 pounds per square inch at the rate of 80 cubic feet per minute. At the end of this period of time grinding was discontinued and the particles were collected in a cyclone separator. The collected particles had an average particle size between 1 and 3 microns and had the same physical properties and acid number as the starting silica material. The product was partially hydrophobic but was non-organophilic in that it was preferentially wetted with water when shaken with a mixture of water and n-butanol. The product was employed as a flatting agent in a clear lacquer identical with that described in the second paragraph of Example I and was satisfactory for flatting purposes. However, it did not give the smoothness of film, ease of dispersion and flatting efficiency obtained with silica aerogels treated with tetraethyl orthosilicate.

The untreated silica material settled and agglomerated in the lacquer when employed as a flatting agent and was not satisfactory as a flatting agent.

What is claimed is:

1. A coating composition containing a film-forming material dissolved in an organic liquid and a flatting amount of solid particles of a silica flatting agent consisting essentially of the hydrophilic to partially hydrophobic but non-organophilic reaction product of (1) an amorphous, hydrophilic, water-insoluble silica material containing a thousand and more of silanol groups and having an acid number above 0.2 and (2) from 2 to 25% by weight, based on the dry silica material, of an organic silicate having the structural formula:

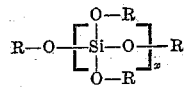

where R is selected from the group consisting of alkyl and alkoxy radicals and $x$ is an integer from 1 to 20.

2. A lacquer containing a flatting amount of solid particles of a silica aerogel flatting agent consisting essentially of the hydrophilic to partially hydrophobic but non-organophilic reaction product of (1) a silica aerogel having an acid number above 0.2 and (2) from 2 to 25% by weight, based on the dry aerogel, of an organic silicate having the structural formula:

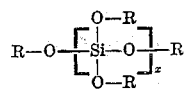

where R is selected from the group consisting of alkyl and alkoxy radicals and $x$ is an integer from 1 to 20.

3. A lacquer as in claim 2, but further characterized in that the lacquer contains nitrocellulose as an essential film-forming material.

4. A lacquer comprising a film-forming material dissolved in an organic liquid phase containing at least one polar organic liquid, which material forms a protective coating on mere evaporation of the liquid phase of the lacquer, and from 4 to 15% by weight, based on the film-forming solids in said lacquer, of solid particles of a reaction product of (1) a silica aerogel having an acid number of 0.2 to 3.0 and (2) from 3 to 20% by weight, based on the dry aerogel, of tetraethyl orthosilicate, said reaction product being further characterized in that it is hydrophilic to partially hydrophobic and non-organophilic.

5. A lacquer as in claim 4, but further characterized in that the film-forming material is nitrocellulose.

6. A lacquer as in claim 4, but further characterized in that the film-forming material is ethyl cellulose.

7. A lacquer as in claim 4, but further characterized in that the film-forming material is cellulose acetobutyrate.

8. A lacquer as in claim 4, but further characterized in that the organic liquid phase comprises a polar alcohol.

9. A coating composition comprising a film-forming material dissolved in an organic liquid phase and from 1 to 30% by weight, based on the film-forming solids in said composition, of non-organophilic, hydrophilic to partially hydrophobic solid particles of a silica material having an acid number above 0.2 and containing silanol groups,

where R is selected from the group consisting of alkyl and alkoxy radicals,

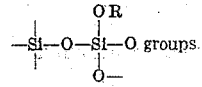

where R has the same significance as given above and the free valences of the oxygen atoms are satisfied by a member selected from the group consisting of silicon atoms and R radicals, and a discontinuous coating of a polymer of an organic silicate having the structural formula:

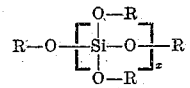

where R has the same significance as given above and $x$ is an integer from 1 to 20.

10. A nitrocellulose lacquer comprising from about 20 to 35% by weight of film-forming solids and about 4 to 15% by weight, based on the film-forming solids in said lacquer, of non-organophilic, hydrophilic to partially hydrophobic solid particles of a silica aerogel having an acid number of 0.2 to 3.0 and containing silanol groups,

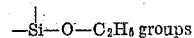

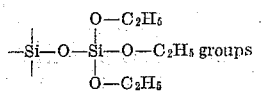

and a partial coating of a polymer of tetraethyl orthosilicate, which polymer is insoluble in diethyl ether, said silica aerogel particles being further characterized in that they have a surface area between 100 and 600 square meters per gram and an average particle size between 0.8 and 3 microns.

11. A process of preparing flatted base grinds which comprises grinding for a period of about 15 to 120 minutes solid particles of a non-organophilic, hydrophilic to partially hydrophobic reaction product of (1) an amorphous, hydrophilic, water-insoluble silica material containing a thousand and more of silanol groups and having an acid number above 0.2 and (2) from 2 to 25% by weight, based on the dry silica material, of an organic silicate having the structural formula:

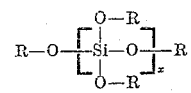

where R is selected from the group consisting of alkyl and alkoxy radicals and $x$ is an integer from 1 to 20, in a coating composition containing about 3 to 12% by weight of film-forming solids dissolved in an organic liquid phase.

12. A process of preparing flatted base grinds suitable for use in flatting lacquers which comprises grinding for a period of about 15 to 120 minutes solid particles of a non-organophilic, hydrophilic to partially hydrophobic reaction product of (1) a silica aerogel having an acid number of 0.2 to 3.0 and (2) from 2 to 25% by weight, based on the dry aerogel, of an organic silicate having the structural formula:

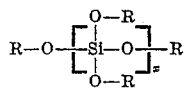

where R is selected from the group consisting of alkyl and alkoxy radicals and $x$ is an integer from 1 to 20, in a lacquer base containing from about 3 to 12% by weight of film-forming solids.

13. A process as in claim 12, but further characterized in that the lacquer base is a nitrocellulose lacquer base.

14. A process of preparing flatted base grinds suitable for use in flatting lacquers which comprises grinding for a period of 30 to 90 minutes in a ball mill solid particles of a non-organophilic, hydrophilic to partially hydrophobic reaction product of (1) a silica aerogel having an acid number of 0.2 to 3.0 and (2) from 3 to 20% by weight, based on the dry aerogel, of tetraethyl orthosilicate, in a nitrocellulose lacquer base containing from about 3 to 12% by weight of film-forming solids.

15. A process of preparing a flatted coating composition which comprises grinding for a period of about 15 to 120 minutes solid particles of a non-organophilic, hydrophilic to partially hydrophobic reaction product of (1) an amorphous, hydrophilic, water-insoluble silica material containing a thousand and more of silanol groups and having an acid number above 0.2 and (2) from 2 to 25% by weight, based on the dry silica material, of an organic silicate having the structural formula:

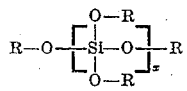

where R is selected from the group consisting of alkyl and alkoxy radicals and $x$ is an integer from 1 to 20, in a coating composition containing from about 3 to 12% by weight of film-forming solids dissolved in an organic liquid, and subsequently mixing the resulting composition with a coating composition containing sufficient film-forming solids to form a final coating composition containing from about 20 to 60% by weight of film-forming solids, said reaction product being employed in amounts of 1 to 30% by weight, based on the film-forming solids in said final coating composition.

16. A process of preparing a flatted nitrocellulose lacquer which comprises grinding in a ball mill for a period of about 30 to 90 minutes solid particles of a reaction product of (1) silica aerogel having an acid number of 0.2 to 3.0 and (2) from about 3 to 20% by weight, based on the dry aerogel, of tetraethyl orthosilicate, in a nitrocellulose lacquer base containing at least one polar organic liquid and from about 3 to 12% by weight of nitrocellulose and subsequently mixing the resulting base grind with a nitrocellulose lacquer containing sufficient film-forming solids to provide a final nitrocellulose lacquer containing from about 20 to 35% by weight of film-forming solids, said reaction product being employed in amounts of about 4 to 15% by weight, based on the film-forming solids in said final nitrocellulose lacquer.

17. A process of preparing a flatted nitrocellulose lacquer which comprises grinding in a ball mill for a period of about 30 to 90 minutes solid particles of a non-organophilic, hydrophilic to partially hydrophobic silica aerogel having an acid number of 0.2 to 3.0 and containing

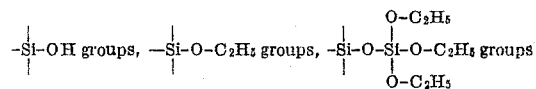

and a partial coating of a polymer of tetraethyl orthosilicate, which polymer is insoluble in diethyl ether, in a nitrocellulose lacquer containing at least one polar organic liquid and from about 3 to 12% by weight of nitrocellulose and subsequently mixing the resulting base grind with a nitrocellulose lacquer containing the same ingredients as said base grind but containing sufficient film-forming solids to provide a final nitrocellulose lacquer containing from about 20 to 35% by weight of film-forming solids, said silica aerogel particles being further characterized in that they have a surface area between 100 and 600 square meters per gram and an average particle size between 0.8 and 3 microns, and are employed in amounts of about 4 to 15% by weight, based on the film-forming solids in said final nitrocellulose lacquer.

References Cited in the file of this patent

UNITED STATES PATENTS

| | | |
|---|---|---|
| 2,170,187 | Clarke | Aug. 22, 1939 |
| 2,180,145 | Harford | Nov. 14, 1939 |
| 2,204,981 | Clough | June 18, 1940 |
| 2,428,608 | Bass | Oct. 7, 1947 |
| 2,570,490 | Saums | Oct. 9, 1951 |
| 2,645,588 | Barry | July 14, 1953 |
| 2,649,388 | Wills | Aug. 18, 1953 |
| 2,657,149 | Iler | Oct. 27, 1953 |

OTHER REFERENCES

White et al.: Ind. and Eng. Chem. 33, pages 1169 to 73 (1941).

UNITED STATES PATENT OFFICE
CERTIFICATE OF CORRECTION

Patent No. 2,870,035 January 20, 1959

Lyman S. Allen

It is hereby certified that error appears in the printed specification of the above numbered patent requiring correction and that the said Letters Patent should read as corrected below.

Column 2, line 42, before "alkaryl" insert -- or --; column 10, line 29, for "where" read -- were --; column 13, lines 40 and 41, claim 1, lines 54 and 55, claim 2, column 14, lines 13 and 14, claim 9, lines 65 and 66, claim 11, and column 15, lines 7 and 8, claim 12, lines 35 and 36, claim 15, strike out "selected from the group consisting of alkyl and alkoxy radicals", each occurrence, and insert instead -- an alkyl radical --.

Signed and sealed this 26th day of May 1959.

(SEAL)
Attest:

KARL H. AXLINE
Attesting Officer

ROBERT C. WATSON
Commissioner of Patents